US010567038B2

(12) United States Patent
Kim et al.

(10) Patent No.: US 10,567,038 B2
(45) Date of Patent: Feb. 18, 2020

(54) WIRELESS POWER TRANSMISSION SYSTEM AND METHOD BASED ON TRANSMISSION SCHEDULE

(71) Applicant: Samsung Electronics Co., Ltd., Suwon-si (KR)

(72) Inventors: Sang Joon Kim, Hwaseong-si (KR); Ui Kun Kwon, Hwaseong-si (KR); Vahid Tarokh, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 14/686,221

(22) Filed: Apr. 14, 2015

(65) Prior Publication Data

US 2016/0028443 A1 Jan. 28, 2016

(30) Foreign Application Priority Data

Jul. 23, 2014 (KR) .................. 10-2014-0093496

(51) Int. Cl.
| | | |
|---|---|---|
| *H04L 12/26* | (2006.01) | |
| *H02J 7/00* | (2006.01) | |
| *H04W 72/04* | (2009.01) | |
| *H02J 4/00* | (2006.01) | |
| *H04B 5/00* | (2006.01) | |
| *H01F 38/14* | (2006.01) | |
| *H04L 12/841* | (2013.01) | |
| *H02J 7/02* | (2016.01) | |
| *H02J 50/40* | (2016.01) | |

(Continued)

(52) U.S. Cl.
CPC ............ *H04B 5/0037* (2013.01); *H02J 7/025* (2013.01); *H02J 50/12* (2016.02); *H02J 50/40* (2016.02); *H02J 50/80* (2016.02); *H04B 5/0075* (2013.01)

(58) Field of Classification Search
CPC ..... H04B 5/0037; H04B 5/0075; H02J 50/80; H02J 50/12; H02J 50/40; H02J 7/025
USPC .................................... 307/89–111
See application file for complete search history.

(56) References Cited

U.S. PATENT DOCUMENTS

| | | | | |
|---|---|---|---|---|
| 8,102,147 B2 * | 1/2012 | Jung | .................... | H02J 7/0027 320/108 |
| 8,248,026 B2 | 8/2012 | Sip | | |

(Continued)

FOREIGN PATENT DOCUMENTS

| | | | |
|---|---|---|---|
| EP | 2833515 | * | 3/2013 |
| JP | WO2013146929 | * | 10/2013 |

(Continued)

OTHER PUBLICATIONS

Kim S. et al., "Analysis of Communications Technology and Energy Transmission Technology for Wireless Charging," Korea Multimedia Society, Sep. 2012 (10 pages).

(Continued)

*Primary Examiner* — Brandon S Cole
(74) *Attorney, Agent, or Firm* — NSIP Law

(57) ABSTRACT

A wireless power transmission system and method thereof are provided. A power transmission apparatus includes a processor configured to classify reception (RX) nodes into a subset, and to determine a transmission schedule based on the subset; and a transmission (TX) resonator configured to wirelessly transmit energy to an RX node corresponding to the subset, based on the transmission schedule.

18 Claims, 18 Drawing Sheets

(51) Int. Cl.
*H02J 50/12* (2016.01)
*H02J 50/80* (2016.01)

(56) References Cited

U.S. PATENT DOCUMENTS

| | | | | |
|---|---|---|---|---|
| 2010/0136943 | A1* | 6/2010 | Hirvela | H04W 4/00 455/404.1 |
| 2010/0265842 | A1* | 10/2010 | Khandekar | H04W 72/0433 370/252 |
| 2012/0080957 | A1* | 4/2012 | Cooper | H02J 5/005 307/104 |
| 2012/0153739 | A1* | 6/2012 | Cooper | H02J 5/005 307/104 |
| 2012/0300754 | A1* | 11/2012 | Rosenqvist | H04B 7/024 370/336 |
| 2012/0309306 | A1* | 12/2012 | Kim | H04B 5/0031 455/41.1 |
| 2012/0313449 | A1* | 12/2012 | Kurs | B60L 11/007 307/104 |
| 2013/0043734 | A1* | 2/2013 | Stone | H04B 5/0037 307/104 |
| 2013/0063082 | A1* | 3/2013 | Lee | H02J 7/025 320/108 |
| 2013/0082653 | A1 | 4/2013 | Lee et al. | |
| 2013/0106364 | A1 | 5/2013 | Baarman et al. | |
| 2013/0121320 | A1* | 5/2013 | Vutukuri | H04J 11/0036 370/337 |
| 2013/0148589 | A1* | 6/2013 | Smith | H04W 74/002 370/329 |
| 2013/0249299 | A1* | 9/2013 | Shijo | H02J 5/005 307/80 |
| 2014/0191713 | A1* | 7/2014 | Hong | H02J 7/0029 320/108 |
| 2015/0130407 | A1* | 5/2015 | Ni | H01F 38/14 320/108 |
| 2016/0020967 | A1* | 1/2016 | Thubert | H04L 43/06 370/252 |
| 2016/0021017 | A1* | 1/2016 | Thubert | H04L 47/28 370/235 |
| 2016/0028443 | A1* | 1/2016 | Kim | H02J 7/025 307/104 |
| 2016/0359375 | A1* | 12/2016 | Lee | H02J 50/12 |

FOREIGN PATENT DOCUMENTS

| | | |
|---|---|---|
| JP | 2013-541313 A | 11/2013 |
| KR | 10-2011-0103455 A | 9/2011 |
| KR | 10-2012-0005484 A | 1/2012 |
| KR | 10-2013-0031765 A | 3/2013 |
| KR | 10-2013-0073862 A | 7/2013 |
| KR | 10-2013-0081776 A | 7/2013 |
| KR | 10-2013-0115433 A | 10/2013 |
| KR | 10-2013-0118118 A | 10/2013 |
| KR | 10-2013-0118462 A | 10/2013 |
| KR | 10-2014-0017760 A | 2/2014 |
| KR | 10-2014-0017768 A | 2/2014 |
| WO | WO 2012/040530 A2 | 3/2012 |

OTHER PUBLICATIONS

Park S., "Wireless Charging Technology Standardization Trend," Telecommunications Technology Association (TTA Journal), vol. 133, Jan. 2011 (7 pages).

Jang B., "Introduction of WPC Wireless Charging Standard (Qi) for Portable IT Devices," Korean Institute of Electromagnetic Engineering and Science, Nov. 2012 (8 pages).

* cited by examiner

700

WIRELESS POWER TRANSMISSION SYSTEM AND METHOD BASED ON TRANSMISSION SCHEDULE

CROSS-REFERENCE TO RELATED APPLICATION(S)

This application claims the benefit under 35 USC 119(a) of Korean Patent Application No. 10-2014-0093496, filed on Jul. 23, 2014, in the Korean Intellectual Property Office, the entire disclosure of which is incorporated herein by reference for all purposes.

BACKGROUND

1. Field

The following description relates to a wireless energy transmission system, and an apparatus and method for wirelessly transmitting energy.

2. Description of Related Art

A use and interoperation between various electronic devices, including mobile devices, has significantly increased over the years. As a result, research on wireless power transmission has been conducted to improve an increasing inconvenience of wired power supplies and limits to existing battery capacities. In particular, the research has been concentrating on near-field wireless power transmission. Near-field wireless power transmission refers to wireless power transmission over a distance between a transmission coil and a reception coil which is sufficiently shorter in comparison to a wavelength at an operation frequency. A wireless power transmission and reception system using resonance characteristics includes a source configured to supply power, and a target configured to receive the supplied power. When wireless power is transmitted and received, the source and the target may need to share control information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a power transmission apparatus, including a processor configured to classify reception (RX) nodes into a subset, and to determine a transmission schedule based on the subset; and a transmission (TX) resonator configured to wirelessly transmit energy to an RX node corresponding to the subset, based on the transmission schedule.

The TX resonator may be configured to wirelessly transmit energy to each of subsets in an order during a transmission period based on the transmission schedule.

The processor may be configured to assign a time interval to the subset, based on the transmission schedule.

The TX resonator may be configured to wirelessly transmit energy to the RX node during the predetermined time interval.

The processor may be configured to classify the RX node with a mutual coupling coefficient equal to or less than a predetermined threshold among the RX nodes as the subset.

The processor may be configured to collect channel information associated with coupling between the RX nodes.

The TX resonator may be configured to transmit energy to another RX node of the RX nodes designated as a temporary subset, and wherein the processor may be configured to collect, from the another RX node, channel information estimated based on the energy transmitted to the temporary subset.

The processor may be configured to generate a coupling coefficient matrix from the collected channel information, and to classify the RX nodes as the subset, based on the coupling coefficient matrix.

The TX resonator may be configured to wirelessly transmit energy to another RX node designated as a temporary subset, and wherein the processor may be configured to estimate a transmission efficiency for the temporary subset, based on a TX energy waveform corresponding to the energy, and to determine the transmission schedule, based on the transmission efficiency.

The processor may be configured to determine a time interval assigned to the subset during a transmission period.

In accordance with another embodiment, there is provided a power reception apparatus, including a processor configured to determine a subset of the power reception apparatus, based on a transmission schedule; and a reception (RX) resonator configured to wirelessly receive energy corresponding to the subset from a transmission (TX) node.

The RX resonator may be configured to wirelessly receive energy from the TX node during a time interval corresponding to the subset including the power reception apparatus.

The processor may be configured to assign a predetermined time interval in which the power reception apparatus is to receive energy from the TX node, based on the transmission schedule.

The power reception apparatus may also include a communicator configured to receive announcement information associated with the subset from the TX node.

The power reception apparatus may also include a communicator configured to transmit channel information associated with coupling between the power reception apparatus and an RX node to the TX node, wherein the TX node uses the channel information to determine the transmission schedule.

The RX resonator may be configured to receive energy from the TX node, in response to the power reception apparatus being designated as a temporary subset, and wherein the processor may be configured to estimate the channel information based on the energy.

The processor may be configured to analyze an RX energy waveform corresponding to the received energy, and to estimate channel information associated with a neighboring RX node designated as the temporary subset.

The power reception apparatus may also include a communicator configured to transmit to the TX node channel information comprising a result obtained by determining whether a neighboring RX node coupled with the power reception apparatus exists, wherein the processor is configured to generate the channel information.

In response to a mutual coupling coefficient corresponding to an RX energy waveform being greater than a threshold, the processor may be configured to determine that the power reception apparatus is coupled with a neighboring RX node designated as the temporary subset.

The power reception apparatus may also include a communicator configured to transmit to the TX node channel information between the power reception apparatus and an RX node adjacent to the power reception apparatus, wherein the processor is configured to transmit energy to the RX node and to estimate the channel information.

In accordance with another embodiment, there is provided a power transmission method, including classifying, though a processor, reception (RX) nodes into a subset, and to determine a transmission schedule based on the subset; and wirelessly transmitting energy from a transmission (TX) resonator to an RX node corresponding to the subset, based on the transmission schedule.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
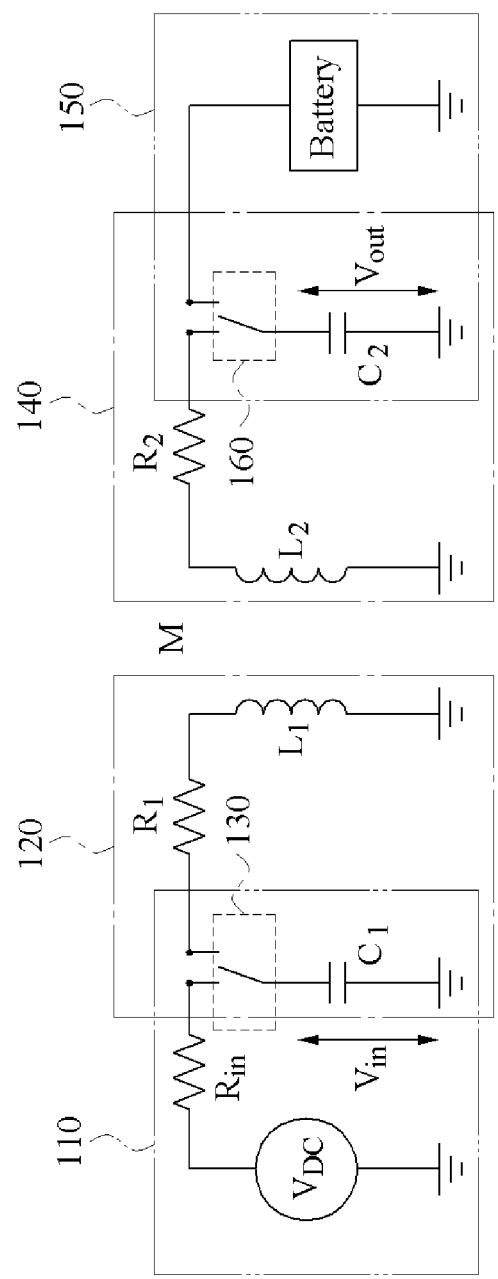
FIG. 1 illustrates an example of a circuit of a wireless energy transmission system, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be applied to various electronic devices and systems requiring wireless power. The wireless power transmission system may be applied to an electronic device enabling use of wireless power, for example a mobile phone, a wireless television (TV), and any other system enabling use of wireless power. Additionally, the wireless power transmission system is applicable in a bio-healthcare field, and may be used to remotely transmit power to a device inserted into a human body, or used to wirelessly transmit power to a bandage-shaped device attached to a human arm for measurement of a heart rate.

The wireless power transmission system may also be applied to a device, for example, a sensor with a great constraint on power consumption, and other similar devices.

Additionally, the wireless power transmission system is used to remotely control an information storage device that does not include a power source. For example, the wireless power transmission system is applied to a system that is configured to supply power to an information storage device to remotely operate the information storage device, and to wirelessly request information stored in the information storage device.

The wireless power transmission system receives energy supplied from a power supply unit, and stores the energy in a source resonator to be used to generate a signal. The wireless power transmission system induces the source resonator to self-resonate by turning off a switch that electrically connects the power supply unit to the source resonator. For example, when a target resonator with the same resonant frequency as the source resonator is disposed within a distance that is close enough to resonate with the source resonator, which self-resonates, a mutual resonance phenomenon may occur between the source resonator and the target resonator. In various examples herein, the source resonator refers to a resonator configured to receive energy from a power supply unit, and the target resonator refers to a resonator configured to receive energy from the source resonator due to the mutual resonance phenomenon.

FIG. 1 illustrates an example of a circuit of a wireless energy transmission system including a wireless energy transmission apparatus and a wireless energy reception apparatus, in accordance with an embodiment. The wireless energy transmission system may be defined as a "resonator isolation (RI) system."

Referring to FIG. 1, the circuit of the wireless energy transmission system has a source-target structure including a source and a target. The circuit of the wireless energy transmission system includes the wireless energy transmission apparatus corresponding to the source, and the wireless energy reception apparatus corresponding to the target.

The wireless energy transmission apparatus includes a power input unit 110, a power transmitter 120, and a switch unit 130. The power input unit 110 stores energy in a capacitor $C_1$ using a power supply unit. In one position, the switch unit 130 connects the capacitor $C_1$ to the power input unit 110, while the energy is stored in the capacitor $C_1$. In another position, the switch unit 130 disconnects the capacitor $C_1$ from the power input unit 110 and connects the capacitor $C_1$ to the power transmitter 120 to charge the power transmitter 120, while the energy stored in the capacitor $C_1$ is discharged. The switch unit 130 prevents the capacitor $C_1$ from being connected to the power input unit 110 and the power transmitter 120 at the same time.

The power transmitter 120 transfers electromagnetic energy to a receiver 140. In the example of FIG. 1, the power transmitter 120 transfers power through mutual resonance between a source resonator of the power transmitter 120 and a target resonator of the receiver 140. The source resonator includes the capacitor $C_1$ and a transmission coil $L_1$, and the target resonator may include a capacitor $C_2$ and a reception coil $L_2$. A level of the mutual resonance between the source resonator and the target resonator is affected by mutual inductance M.

The power input unit 110 is modeled to an input voltage $V_{DC}$, an internal resistor $R_{in}$, and the capacitor $C_1$, and the power transmitter 120 is modeled to circuit elements $R_1$, $L_1$, and $C_1$. Additionally, the switch unit 130 may be re-configured as a plurality of switches. For example, in one configuration, the switch unit 130 includes an active element enabling an on/off function. In FIG. 1, R, L, and C represent a resistance, an inductance, and a capacitance, respectively. A voltage applied to the capacitor $C_1$ among the input voltage $V_{DC}$ is represented by $V_{in}$.

In FIG. 1, the wireless energy reception apparatus includes the receiver 140, a power output unit 150, and a switch unit 160. The receiver 140 receives electromagnetic energy from the power transmitter 120, and stores the received electromagnetic energy in the connected capacitor $C_2$. For example, in one position, the switch unit 160 connects the capacitor $C_2$ to the receiver 140, while the energy is stored in the capacitor $C_2$. Further, in another position, the switch unit 160 disconnects the capacitor $C_2$ from the receiver 140, and connects the capacitor $C_2$ to the power output unit 150, while the energy in the capacitor $C_2$ is transferred to a load. The switch unit 160 prevents the capacitor $C_2$ from being connected to the receiver 140 and the power output unit 150 at the same time.

The reception coil $L_2$ of the receiver 140 receives power through mutual resonance with the transmission coil $L_1$ of the power transmitter 120. The received power is used to charge the capacitor $C_2$ connected to the reception coil $L_2$, while the switch unit 160 is in the position connecting the capacitor $C_2$ to the receiver 140. In an example, the power output unit 150 transfers the power used to charge the capacitor $C_2$ to a battery. In another example, the power output unit 150 transfers the power to a load or a target device, instead of the battery.

The receiver 140 includes circuit elements $R_2$, $L_2$, and $C_2$, and the power output unit 150 includes the connected capacitor $C_2$ and the battery. The switch unit 160 may be configured to include multiple switches. A voltage applied to the capacitor $C_2$ from the energy received at the reception coil $L_2$ is represented by $V_{out}$.

The wireless energy transmission system enables power to be transmitted in an example in which the power input unit 110 is physically separated from the power transmitter 120 and the receiver 140 is physically separated from the power output unit 150. The wireless energy transmission system has various advantages in comparison to an existing power transmission method using impedance matching. For example, the wireless energy transmission system may not need a power amplifier, because power may be supplied from a direct current (DC) source directly to a source resonator. Further, the wireless energy transmission system may not require a rectifying operation of a rectifier, because energy is captured from power that is used to charge a capacitor of a reception (RX) terminal in order to charge the battery. Moreover, a transmission efficiency is not sensitive to a change in a distance between a transmission (TX) terminal and an RX terminal, because there is no need to perform impedance matching. Additionally, the wireless energy transmission system may be easily extended to a wireless energy transmission system including a plurality of TX terminals, each including the wireless energy transmission apparatus previously described, and a plurality of RX terminals, each including the wireless energy reception apparatus previously described.

Figure 2:
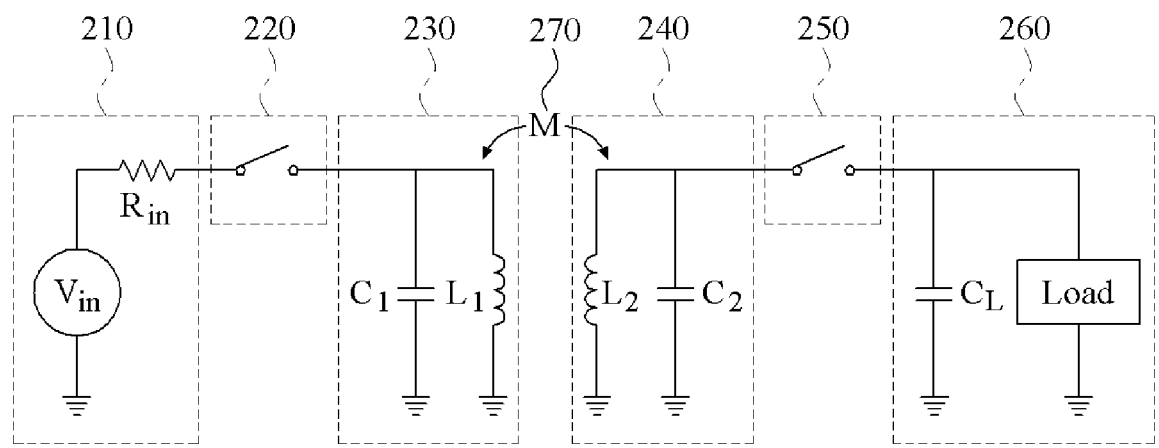
FIG. 2 illustrates another example of a circuit of a wireless energy transmission system, in accordance with an embodiment.

FIG. 2 illustrates another example of a circuit of a wireless energy transmission system, in accordance with an embodiment. That is, FIG. 2 illustrates another example of an RI system.

Referring to FIG. 2, the wireless energy transmission system has a source-target structure including a source device and a target device. The wireless energy transmission system includes a wireless energy transmission apparatus corresponding to the source device, and a wireless energy reception apparatus corresponding to the target device.

The wireless energy transmission apparatus includes a power charger 210, a controller 220, and a transmitter 230. The power charger 210 includes a power supply unit $V_{in}$, and an internal resistor $R_{in}$. The transmitter 230 includes a source resonator including a capacitor $C_1$ and an inductor $L_1$. The transmitter 230 transmits energy stored in the source resonator to the wireless energy reception apparatus, through mutual resonance between the source resonator and a target resonator at the wireless energy reception apparatus. The controller 220 turns on a switch to enable power to be supplied from the power charger 210 to the source resonator. Voltage is applied from the power supply unit $V_{in}$ to the capacitor $C_1$, and current is applied to the inductor $L_1$. For example, when the source resonator reaches a steady state, the voltage applied to the capacitor $C_1$ has a value of "0", and the current flowing through the inductor $L_1$ has a value of "$V_{in}/R_{in}$." In the steady state, the inductor $L_1$ is charged with power using the current applied to the inductor $L_1$.

For example, when the power used to charge the source resonator in the steady state reaches a predetermined value, the controller 220 turns off the switch. The predetermined value is set by the controller 220. The controller 220 sets or defines the predetermined value during set-up of the wireless transmission apparatus or depending on variances in voltage and current, the controller 220 may re-set the predetermined value during operation. Based on an operation of the switch, the power charger 210 is separated from the transmitter 230. In this example, when the switch is turned off, the source resonator starts self-resonating between the capacitor $C_1$ and the inductor $L_1$. Energy stored in the source resonator is transferred to the target resonator, through a mutual inductance M 270 between the source resonator and the target resonator. In one example, a resonant frequency $f_1$ of the source resonator is the same as a resonant frequency $f_2$ of the target resonator. Additionally, the resonant frequencies $f_1$ and $f_2$ are calculated using Equation 1 as shown below.

$$f_1 = \frac{1}{2\pi\sqrt{L_1 C_1}}, \qquad \text{[Equation 1]}$$

$$f_2 = \frac{1}{2\pi\sqrt{L_2 C_2}}$$

The wireless energy reception apparatus includes a charger 240, a controller 250, and a power output unit 260. In FIG. 2, a target resonator includes a capacitor $C_2$ and an inductor $L_2$. During mutual resonance between the source resonator and the target resonator, the source resonator is separated from the power supply unit $V_{in}$, and the target resonator is separated from a load and a capacitor $C_L$. During mutual resonance, the switches controlled by controllers 220 and 250, respectively, are normally open. The capacitor $C_2$ and the inductor $L_2$ of the target resonator are charged with power through the mutual resonance. To charge the target resonator with power, the controller 250 turns off the switch. For example, when the switch is turned off, the target resonator has the same resonant frequency as the source resonator and, as a result, the source resonator and the target resonator resonate with each other.

When the power used to charge the target resonator reaches a predetermined value, the controller 250 turns the switch on. The predetermined value is set by the controller 250. The controller 250 sets or defines the predetermined value during set-up of the wireless transmission apparatus or depending on variances in voltage and current, the controller 250 may re-set the predetermined value during operation. By turning the switch on, the capacitor $C_L$ is connected to the charger 240, and the resonant frequency of the target resonator may be changed, as shown in Equation 2 below.

$$f_2' = \frac{1}{2\pi\sqrt{L_2(C_2 + C_L)}} \quad \text{[Equation 2]}$$

Accordingly, the resonant frequency $f_2$ of the target resonator may become different from the resonant frequency $f_1$ of the source resonator, which may cause the mutual resonance between the source resonator and the target resonator to be terminated. For example, when $f_2'$ is much smaller than $f_2$ based on a Q-factor of the target resonator, a mutual resonance channel is removed. Additionally, the power output unit 260 transfers power used to charge the capacitor $C_2$ and the inductor $L_2$ to a load. The power output unit 260 transfers the power, for example, using a scheme suitable for the load. For example, the power output unit 260 regulates a voltage to a rated voltage that is required by the load, and transfers power.

When a value of the power used to charge the target resonator is less than a predetermined value, the controller 250 turns off the switch, which may cause the resonant frequency $f_1$ of the source resonator to become identical to the resonant frequency $f_2$ of the target resonator. Accordingly, the charger 240 recharges the target resonator with power using the mutual resonance between the source resonator and the target resonator.

During the mutual resonance between the source resonator and the target resonator, the switches at the wireless energy transmission apparatus and the wireless energy reception apparatus are not connected. Accordingly, the configuration of the wireless energy transmission apparatus prevents a transmission efficiency from being reduced due to a connection to the switch.

A scheme of FIG. 2 to control a point in time to capture energy stored in a target resonator is easily performed. In the scheme of FIG. 1, a wireless power transmission apparatus captures the energy stored in the capacitor. However, in a scheme of FIG. 2, which changes a resonant frequency and capturing energy, energy stored in an inductor and a capacitor of a target resonator is captured. Accordingly, a degree of freedom for the point in time to capture energy is improved.

To transmit power or data, a transmitting (TX) terminal in the RI system repeatedly charges a source resonator with energy and discharges energy through a connection to a switch. In various examples herein, a single charge and discharge of energy is defined as a single symbol. To receive energy or data from the TX terminal, a receiving (RX) terminal in the RI system operates a switch of the RX terminal, based on an operation period of a switch of the TX terminal that repeatedly charges and discharges.

To receive power or data from the TX terminal without an error, the RX terminal needs to know when the switch of the TX terminal is turned off, when the switch of the TX terminal is turned on, when the mutual resonance is started, and when energy stored in the target resonator has a peak value. An operation of acquiring information regarding an on/off time of the switch of the TX terminal, and of adjusting an on/off time of the switch of the RX terminal based on the acquired information may be defined as "time synchronization."

To transfer information, the RI system uses a mutual resonance phenomenon between a source resonator and a target resonator. For example, the TX terminal induces a phenomenon in which mutual resonance occurs for a predetermined time interval, or a phenomenon in which mutual resonance does not occur for the predetermined time interval, through an operation in which energy is supplied or is not supplied to the source resonator for the predetermined time interval, and assigns information to each of the phenomena. For example, the TX terminal assigns a bit "1" to the phenomenon in which the mutual resonance occurs, and assigns a bit "0" to the phenomenon in which the mutual resonance does not occur. The predetermined time interval is defined, for example, as a single symbol.

The RX terminal induces a phenomenon in which mutual resonance occurs for a predetermined time interval, or a phenomenon in which mutual resonance does not occur for the predetermined time interval, through an operation in which a resonant frequency of the target resonator is matched to or is not matched to a resonant frequency of the source resonator. The RX terminal assigns information to each of the phenomena. For example, the RX terminal assigns a bit "1" to the phenomenon in which the mutual resonance occurs, and assigns a bit "0" to the phenomenon in which the mutual resonance does not occur.

In a scheme of transferring information in a symbol unit, symbols may be required to be synchronized first. To synchronize symbols, the RX terminal performs synchronization matching. For example, when the synchronization matching is performed in the RX terminal, data is bidirectionally transmitted between the TX terminal and the RX terminal by a protocol that is set in advance.

In the following description, the TX terminal and the RX terminal in the RI system are referred to as a TX node and an RX node, respectively.

Hereinafter, embodiments will be further described with reference to the accompanying drawings.

For near-field wireless power transmission, an electromagnetic induction scheme or a magnetic resonance scheme is used. In the above schemes, a magnetic field is generated through a transmission coil (for example, a TX resonator) at a provided operating frequency. Also, energy stored in the generated magnetic field is induced at a reception coil (for example, an RX resonator) and, as a result, a current is generated.

The near-field wireless power transmission typically refers to wireless power transmission over a distance between a transmission coil and a reception coil, which is sufficiently shorter in comparison to a wavelength corresponding to an operation frequency.

Transmission of power between the transmission coil and the reception coil may be interpreted as an equivalent circuit model. For example, by replacing physical properties of the transmission coil and the reception coil by circuit elements (for example, R, L, and C), properties of the circuit elements at an operating frequency are attained.

In an example, a wireless power transmission system by a TX resonator and an RX resonator are represented as an equivalent circuit model.

To increase a transmission efficiency in the equivalent circuit model, a frequency at which the transmission efficiency is maximized, based on a distance between a power transmission apparatus and a power reception apparatus, needs to be matched. When the distance between the power transmission apparatus and the power reception apparatus is changed, the frequency at which the transmission efficiency is maximized may change. Despite matching between a resonant frequency of a TX resonator and a resonant frequency of an RX resonator, the frequency at which the transmission efficiency is maximized changes based on the distance between the power transmission apparatus and the power reception apparatus. Accordingly, to increase the transmission efficiency, an operating frequency of the wireless power transmission system needs to be corrected to an optimum frequency in a current operation distance between the power transmission apparatus and the power reception apparatus.

Additionally, to increase the transmission efficiency in the equivalent circuit model, impedance matching between an input/output (I/O) terminal of each of the power transmission apparatus and the power reception apparatus may be required. For example, impedance matching enables maximization of power input to a TX resonator, and maximizes power transferred from an RX resonator to a load of the power reception apparatus. When impedance matching is performed, input power may be reflected, which causes a reduction in the transmission efficiency and a damage in a circuit. To realize the above-described impedance matching, a characteristic of each of the TX resonator and the RX resonator, an impedance of a load connected to the RX resonator, and a channel characteristic between the power transmission apparatus and the power reception apparatus, for example, a distance and a medium of media, are considered in the configuration of the wireless power transmission system.

Furthermore, a power amplifier (PA) of the power transmission apparatus, and a rectifier of the power reception apparatus may be included in the wireless power transmission system. For example, to increase the transmission efficiency of the wireless power transmission system, an efficiency of each of the PA and the rectifier may need to be improved.

Because frequency and impedance matching are changed based on a number of RX resonators within a near field, and a relative position between RX resonators, the transmission efficiency is reduced when a plurality of power reception apparatuses exist. For example, when the number of RX resonators increases, a number of combinations of positions of power reception apparatuses increases and it becomes difficult to optimally tune a characteristic of an individual RX resonator.

In the RI system, a power I/O terminal is separated from a power TX/RX circuit and accordingly, the transmission efficiency is enhanced. To separate the power I/O terminal and the power TX/RX circuit, the RI system repeatedly performs a process of charging a capacitor of a resonator with energy, and a process of connecting the charged capacitor to an inductor and discharging energy.

The above-described RI system does not require frequency matching and impedance matching. For example, because the RI system does not require matching based on a number of RX resonators and a relative position between RX resonators, a transmission efficiency in a system including a plurality of power reception apparatuses is easily improved.

Hereinafter, a power transmission apparatus, a power reception apparatus, and a power transmission method are provided. The power transmission apparatus is configured to wirelessly transmit energy based on a transmission schedule to maximize a transmission efficiency in an RI system including a plurality of power reception apparatuses.

Figure 3:
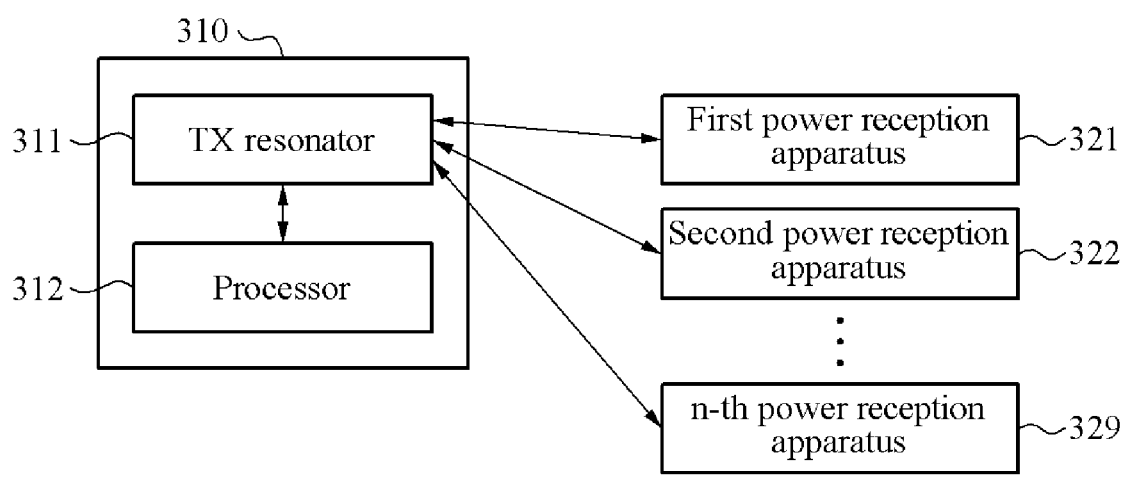
FIG. 3 illustrates an example of a wireless power transmission system, in accordance with an embodiment.

FIG. 3 illustrates a wireless power transmission system 300, in accordance with an embodiment.

Referring to FIG. 3, the wireless power transmission system 300 includes a power transmission apparatus 310, and a plurality of power reception apparatuses, for example, a first power reception apparatus 321, a second power reception apparatus 322, and an n-th power reception apparatus 329. An example of a configuration of the wireless power transmission system 300 will be further described with reference to FIG. 7.

The power transmission apparatus 310 includes a TX resonator 311 and a processor 312.

The TX resonator 311 wirelessly transmits energy to at least one RX node corresponding to each of one or more subsets, based on a transmission schedule. For example, the TX resonator 311 wirelessly transmits energy to all RX nodes included in a predetermined subset during a time interval of a transmission schedule. The time interval corresponds to the predetermined subset, and the predetermined subset may be, for example, a subset including a portion of a plurality of RX nodes. Among the plurality of RX nodes, at least one RX node included in each of the one or more subsets may be classified by the processor 312.

The processor 312 classifies a plurality of RX nodes as at least one subset. In one illustrative example, a power transmission apparatus and a power reception apparatus are referred to as a TX node and an RX node, respectively. The first power reception apparatus 321 to the n-th power reception apparatus 329 are referred to as RX nodes.

A subset may be, for example, a set of a portion of the RX nodes included in the wireless power transmission system 300. Each subset includes at least one RX node. The subsets including multiple RX nodes, may be classified based on a predetermined criterion, for example, whether the RX nodes are coupled with each other. A subset including of the multiple RX nodes will be further described with reference to FIG. 7.

Additionally, the processor 312 determines a transmission schedule based on at least one subset. The transmission schedule refers to a schedule to wirelessly transmit energy to the plurality of RX nodes, and includes an order in which a TX node transmits energy to the at least one subset. The transmission schedule will be further described with reference to FIG. 15.

The processor 312 forms one of the at least one subset including power reception apparatuses with a mutual coupling coefficient equal to or less than a predetermined threshold among the first power reception apparatus 321 to the n-th power reception apparatus 329. The power transmission apparatus 310 determines a transmission schedule to transmit energy for each subset via the TX resonator 311.

For example, a mutual coupling coefficient of at least one power reception apparatus included in each subset is equal to or less than a predetermined threshold. Additionally, when a single power reception apparatus is included in a subset, a mutual coupling coefficient has a value of "0," because the mutual coupling coefficient does not exist. In other words, the mutual coupling coefficient is equal to or less than the predetermined threshold.

The processor 312 forms channel information associated with a near magnetic field channel in which a plurality of RX nodes exist. The channel information refers to coupling information associated with coupling between the RX nodes, and includes, for example, a mutual coupling coefficient between the RX nodes, a waveform of energy transmitted by the power transmission apparatus 310, a waveform of energy received by the first power reception apparatus 321 to the n-th power reception apparatus 329, or whether a neighboring RX node with a mutual coupling coefficient greater than a threshold exists. The processor 312 computes a coupling coefficient matrix, based on the coupling information and the channel information. In accordance with an illustrative example, a waveform of energy transmitted by a power transmission apparatus, and a waveform of energy received by a power reception apparatus are referred to as a TX energy waveform and an RX energy waveform, respectively.

To collect the above-described channel information, the processor 312 designates a portion of the RX nodes as a temporary subset, and transmits energy used to estimate the channel information to RX nodes designated as the temporary subset via the TX resonator 311. The RX nodes designated as the temporary subset analyze a waveform of the energy received via an RX resonator of the temporary subset and estimates the channel information. For example, the RX nodes determine whether another RX node with a mutual coupling coefficient greater than a predetermined threshold exists, and notify the TX node of a determination result. The temporary subset refers to a subset temporarily formed to collect channel information, and includes all combinations of the RX nodes in an order of the RX nodes. The combinations will be further described with reference to FIG. 13.

Additionally, to collect the channel information, the processor 312 transmits energy to the temporary subset, analyzes a waveform of energy of the processor 312, and estimates a total transmission efficiency. An example of estimation of the total transmission efficiency will be further described with reference to FIG. 14.

The wireless power transmission system 300 is applied to various systems requiring simultaneous transmission of energy and data. For example, in an environment in which wirelessly rechargeable terminals, for example, a mobile phone or a wireless TV, all exist, the wireless power transmission system 300 is utilized to efficiently manage resources to be charged. In this example, energy and data are transmitted via different channels.

In accord with an embodiment, the wireless power transmission system 300 maximizes an energy transmission efficiency in an RI system including RX nodes. Additionally, the wireless power transmission system 300 determines a transmission schedule to transmit energy to the plurality of RX nodes.

Figure 4:
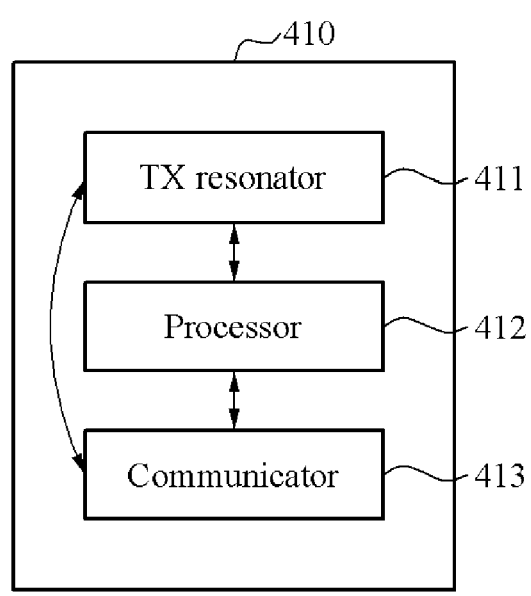
FIG. 4 illustrates an example of a configuration of a power transmission apparatus, in accordance with an embodiment.

FIG. 4 illustrates an example of a configuration of a power transmission apparatus 410, in accordance with an embodiment.

Referring to FIG. 4, the power transmission apparatus 410 includes a TX resonator 411, a processor 412, and a communicator 413.

The TX resonator 411 wirelessly transmits energy to each of at least one subset in a predetermined subset order during a transmission period, based on a transmission schedule. For example, the TX resonator 411 wirelessly transmits energy to at least one RX node corresponding to a subset during a predetermined time interval in the transmission period.

The processor 412 classifies at least one RX node with a mutual coupling coefficient equal to or less than a predetermined threshold among RX nodes, as one of the at least one subset. Additionally, the processor 412 assigns a predetermined time interval to a subset, based on the transmission schedule. For example, the processor 412 determines a time interval of the transmission period to be assigned to each of at least one subset, based on a number of the at least one subset.

To determine the transmission schedule, the processor 412 collects channel information about the RX nodes from the RX nodes. In an example, when the TX resonator 411 transmits energy to at least one RX node designated as a temporary subset, the processor 412 receives channel information estimated by the at least one RX node from the at least one RX node, based on the energy transmitted to the temporary subset. The at least one RX node transmits channel information associated with all combinations of the at least one RX node in the temporary subset to the processor 412 by changing the combinations. In another example, the processor 412 receives channel information associated with combinations of the at least one RX node. In this example, a minimum number of the combinations is required to generate a coupling coefficient matrix.

The processor 412 generates a coupling coefficient matrix from the collected channel information, and classifies the RX nodes as at least one subset, based on the coupling coefficient matrix.

In another example, when the TX resonator 411 wirelessly transmits energy to at least one RX node designated as a temporary subset, the processor 412 estimates a transmission efficiency for the temporary subset, based on an internal energy waveform corresponding to the energy, and determines a transmission schedule, based on the estimated transmission efficiency. In this example, the processor 412 determines a set having a maximum transmission efficiency of a temporary subset, based on a transmission efficiency estimated from each temporary subset, and determines the transmission schedule based on the determined set.

The communicator 413 notifies an RX node of a temporary subset and a subset, or receives channel information from the RX node. For example, the communicator 413 transmits announcement information indicating that a predetermined RX node is included in a predetermined subset, such as a temporary subset or a subset. The communicator 413 is separate from the TX resonator 411 as shown in FIG. 4, however, other configurations may be provided, including, but not limited to the communicator 413 being part of the TX resonator 411. Accordingly, the communicator 413 and the TX resonator 411 may be configured as the same module. However, a channel via which energy used by the communicator 413 and the TX resonator 411 is transmitted may be different from a channel via which channel information is transmitted.

Figure 5:
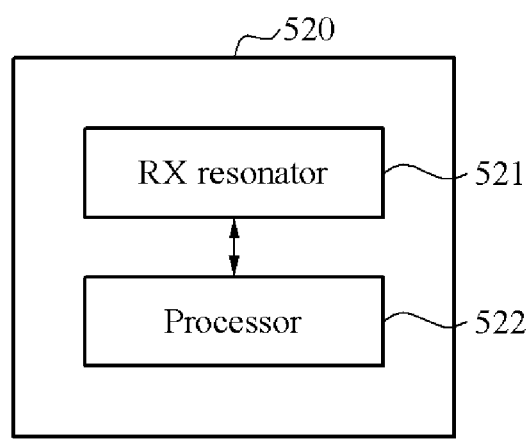
FIGS. 5 and 6 illustrate examples of configurations of power reception apparatuses, in accordance with an embodiment.
Figure 6:
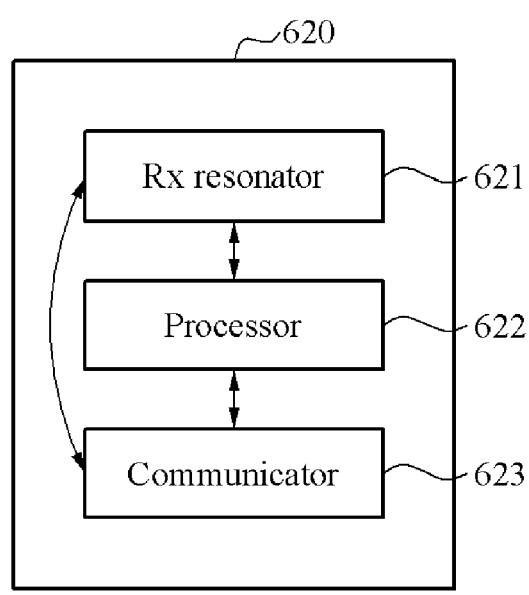

FIGS. 5 and 6 illustrate examples of configurations of power reception apparatuses 520 and 620, respectively, in accordance with an embodiment.

Referring to FIG. 5, the power reception apparatus 520 includes an RX resonator 521 and a processor 522.

The RX resonator 521 wirelessly receives energy corresponding to a subset from a TX node. For example, the RX resonator 521 wirelessly receives energy from the TX node during a time interval corresponding to a subset including the power reception apparatus 520.

The processor 522 determines a subset corresponding to the power reception apparatus 520, based on a transmission schedule determined by the TX node. Based on the transmission schedule, the processor 522 assigns a predetermined time interval during which the power reception apparatus 520 is to receive energy from the TX node. For example, the processor 522 receives from the TX node through a communicator (not shown), announcement information indicating that the power reception apparatus 520 is included in a predetermined subset. The TX node transmits the announcement information to the power reception apparatus 520, based on the transmission schedule.

Additionally, the processor 522 classifies the power reception apparatus 520 and at least one RX node as one of at least one subset. In one example, a mutual coupling coefficient between the power reception apparatus 520 and the at least one RX node is equal to or less than a predetermined threshold. For example, when a single RX node is included in a subset, a mutual coupling coefficient for the subset may not exist, that is, may have a value of "0."

In an example, when the power reception apparatus 520 is designated as a temporary subset, and when the RX resonator 521 receives energy from the TX node, based on the received energy, the processor 522 estimates channel information associated with a neighboring RX node. In this example, the processor 522 analyzes an energy waveform corresponding to the received energy, and estimates channel information associated with a neighboring RX node designated as a temporary subset. When a mutual coupling coefficient corresponding to the analyzed energy waveform is greater than a predetermined threshold, the processor 522 determines that coupling with the neighboring RX node is formed during receiving of the energy.

In another example, the processor 522 transmits energy to an RX node neighboring the power reception apparatus 520, and estimates channel information between the neighboring RX node and the power reception apparatus 520. The channel information is, for example, a mutual coupling coefficient between the neighboring RX node and the power reception apparatus 520.

In an example, when the power reception apparatus 520 is designated as a temporary subset, the RX resonator 521 receives energy from the TX node, and the processor 522 estimates channel information based on the received energy.

In another example, the processor 522 transmits energy to an RX node neighboring the power reception apparatus 520, and estimates channel information between the RX node and the power reception apparatus 520. The communicator transmits the channel information estimated by the power reception apparatus 520 to the TX node.

Referring to FIG. 6, the power reception apparatus 620 includes an RX resonator 621, a processor 622, and a communicator 623. In one configuration, the RX resonator 621 and the processor 622 of FIG. 6 operate similarly to the RX resonator 521 and the processor 522 of FIG. 5, respectively.

The communicator 623 transmits, to a TX node, channel information associated with a plurality of RX nodes. Additionally, the communicator 623 receives from the TX node announcement information associated with a subset including the power reception apparatus 620.

Figure 7:
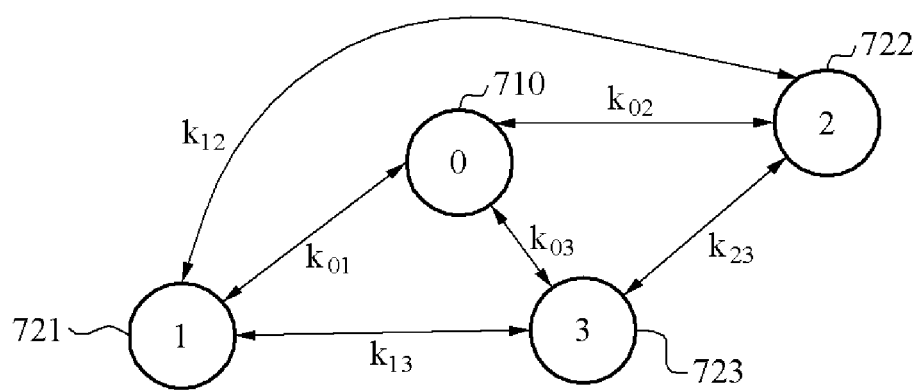
FIG. 7 illustrates an example of a configuration of a wireless power transmission system, in accordance with an embodiment.

FIG. 7 illustrates an example of a configuration of a wireless power transmission system 700, in accordance with an embodiment.

Referring to FIG. 7, the wireless power transmission system 700 includes a single power transmission apparatus, and three power reception apparatuses. The power transmission apparatus is represented as a TX node 710, and the three power reception apparatuses are represented as a first RX node 721, a second RX node 722, and a third RX node 723. The TX node 710 and the first RX node 721 to the third RX node 723 form the same near magnetic field channel. The three power reception apparatuses are included in the wireless power transmission system 700 as shown in FIG. 7. In an alternative configuration, one or more of the three power reception apparatuses may be external to the wireless power transmission system 700. In one example, at least two power reception apparatuses are included in the wireless power transmission system 700.

In FIG. 7, $k_{01}$, $k_{02}$, and $k_{03}$ denotes a mutual coupling coefficient between the TX node 710 and the first RX node 721, a mutual coupling coefficient between the TX node 710 and the second RX node 722, and a mutual coupling coefficient between the TX node 710 and the third RX node 723, respectively. Additionally, $k_{12}$, $k_{13}$, and $k_{23}$ denotes a mutual coupling coefficient between the first RX node 721 and the second RX node 722, a mutual coupling coefficient between the first RX node 721 and the third RX node 723, and a mutual coupling coefficient between the second RX node 722 and the third RX node 723, respectively.

The wireless power transmission system 700, as a multi-node RI system, corresponds to a circuit model associated with Equation 3 shown below. Hereinafter, a node refers to a TX node or an RX node.

$$\frac{1}{C_j} \int i_j(t)dt + R_j i_j(t) + L_j \frac{di_j(t)}{dt} + \sum_{k \neq j} M_{jk} \frac{di_k(t)}{dt} = v_j(t) \qquad \text{[Equation 3]}$$

In Equation 3, $j \in \{1, 2, \ldots, n\}$ in which n denotes a total number of nodes included in the wireless power transmission system 700. Additionally, $i_j(t)$ denotes a current induced at a resonator of a j-th node in a time t, and $v_j(t)$ denotes a voltage induced at the resonator of the j-th node in the time t. $R_j$, $C_j$, and $L_j$ denote a resistance value, a capacitance value, and an inductance value of the resonator of the j-th node, respectively. $M_{jk}$ denotes a mutual inductance between a j-th resonator and a k-th resonator. For example, an amount of energy applied to a resonator of an individual node over time based on an initial condition is calculated from Equation 3. The amount of energy is calculated as shown in Equation 4 below.

$$E_j(t) = \frac{1}{2} L_f I_j^2(t) + \frac{1}{2} C_j V_j^2(t) \qquad \text{[Equation 4]}$$

In Equation 4, $E_j(t)$ denotes an amount of energy induced at the resonator of the j-th node in the time t.

An RI system charges an energy charging element, for example, an inductor or a capacitor, of a TX resonator in an energy TX terminal, for example, a power transmission apparatus. The RI system also induces mutual resonance to wirelessly transmit energy to an RX resonator in an energy RX terminal, such as a power reception apparatus included in a near magnetic field. When a maximum amount of energy is induced at the RX resonator, the energy RX terminal interrupts the mutual resonance, and uses the received energy. In view of energy wireless transmission, energy transmitted to the j-th node is represented as shown in Equation 5 below.

$$ERX_j = \max\{E_j(t)\} \qquad \text{[Equation 5]}$$

For example, when a single energy TX terminal and a single energy RX terminal exist, a circuit model is represented by a quadratic simultaneous differential equation with two unknowns, and a characteristic polynomial is a quartic equation. ERX denoting input energy normalized from the quartic equation (for example, ETX=1) is derived from Equation 6 shown below.

$$ERX = \exp\left(-\frac{\pi}{kQ}\right) \qquad \text{[Equation 6]}$$

In Equation 6, k denotes a mutual coupling coefficient between a TX terminal and an RX terminal. Additionally, Q denotes a quality factor, and is represented by $$Q = \frac{1}{R}\sqrt{\frac{L}{C}}.$$

A point in time at which maximum energy is applied to the RX terminal is represented by $$t = \frac{\pi}{kQ}.$$

In an example, when a single energy TX terminal, for example, the TX node 710, and a plurality of energy RX terminals, such as the first RX node 721 to the third RX node 723, are included in the wireless power transmission system 700, a corresponding circuit model is analyzed to determine a transmission schedule to maximize an energy transmission efficiency.

A resistance value R, an inductance value L, and a capacitance value C of each of the RX nodes in the wireless power transmission system 700 are provided before transmission of energy and, accordingly, are determined as constants. To determine a transmission schedule, a coupling coefficient matrix is required. A coupling coefficient matrix K is represented as shown in Equation 7 below.

$$K = \begin{bmatrix} k_{00} & \cdots & k_{0n} \\ \vdots & \ddots & \vdots \\ k_{n0} & \cdots & k_{nn} \end{bmatrix} \qquad \text{[Equation 7]}$$

In Equation 7, $k_{xy}$ denotes a mutual coupling coefficient between an x-th node and a y-th node, and x and y are each integers equal to or greater than "0" and equal to or less than "n" that is an integer equal to or greater than "1." For example, a zeroth node is assumed as a TX node, and a first node to an n-th node is assumed as RX nodes. In this example, a circuit model corresponding to the zeroth node and the first node to the n-th node is represented by a quadratic simultaneous differential equation with (n+1) unknowns. Because a general solution of a characteristic polynomial equal to or greater than a polynomial of a fifth degree may not be acquired, a symmetric case is assumed to acquire a general solution.

In one example, the wireless power transmission system 700 of the symmetric case includes all identical resonators, all RX nodes are symmetric to the TX node 710, and coupling between the RX nodes are assumed to be in the same state. In this example, a mutual coupling coefficient k is represented as shown in Equation 8 below.

$$k_{ij} = \begin{cases} k_1 & \text{when } i = 0,\ j \neq 0 \\ k_2 & \text{when } i \neq 0,\ j \neq 0 \end{cases} \qquad \text{[Equation 8]}$$

Circuit models to which the mutual coupling coefficient k based on Equation 8 is applied is represented as shown in Equations 9 and 10 below.

$$\frac{1}{C}\int i_0(t)dt + Ri_0(t) + L\frac{di_0(t)}{dt} + NM_1\frac{di_1(t)}{dt} = v_0(t) \qquad \text{[Equation 9]}$$

$$\frac{1}{C}\int i_1(t)dt + Ri_1(t) + \\ (L+(N-1)M_2)\frac{di_1(t)}{dt} + M_2\frac{di_0(t)}{dt} = v_1(t) \qquad \text{[Equation 10]}$$

Energy transmitted to each RX node in the circuit models of Equations 9 and 10 is induced to be identical to energy transmitted to a single RX node with an equivalent coupling coefficient $k_{eq}$ of Equation 11 shown below.

$$k_{eq} = \frac{\sqrt{N}\,k_1}{\sqrt{1+(N-1)k_2}} \qquad \text{[Equation 11]}$$

In Equation 11, the equivalent coupling coefficient $k_{eq}$ increases when a mutual coupling coefficient $k_1$ between a TX node and an RX node increases, and a mutual coupling coefficient $k_2$ between RX nodes decreases. For example, when the mutual coupling coefficient $k_2$ has a value of "0," the equivalent coupling coefficient $k_{eq}$ is represented by $k_{eq} = \sqrt{N}k_1$, and transferred energy is represented as shown in Equation 12 below.

$$ERX = \exp\left(-\frac{\pi}{\sqrt{N}\,kQ}\right) \qquad \text{[Equation 12]}$$

Based on Equation 12, a transmission efficiency increases in a symmetric channel in which RX nodes are not coupled to each other.

As described above, to maximize a transmission efficiency in a multi-node channel, a transmission schedule is determined to minimize coupling between RX nodes. For example, the TX node 710 determines a combination of subsets, based on the coupling coefficient matrix K. Each of the subset includes RX nodes with a mutual coupling coefficient equal to or less than a predetermined threshold. The TX node 710 transmits energy to each of the subsets in an order of time intervals, based on a transmission schedule. The transmission schedule includes, for example, an order in which energy is transmitted to each of the subsets.

Hereinafter, an example of a schedule to transmit energy from the TX node 710 to the first RX node 721 to the third RX node 723 in the wireless power transmission system 700 will be further described with reference to FIGS. 8 and 9.

Figure 8:
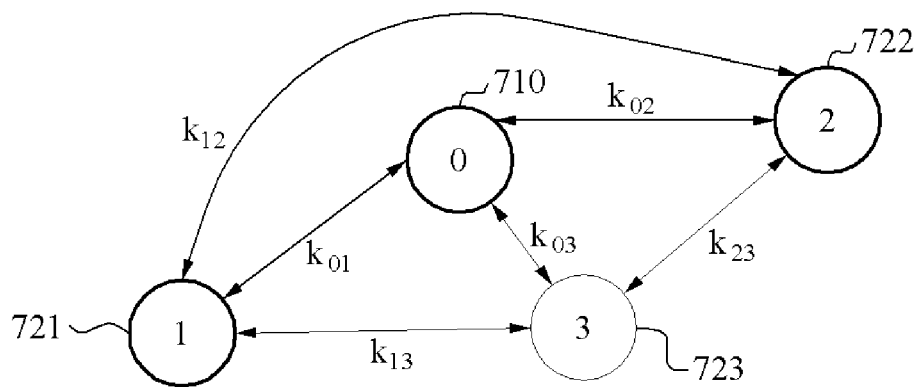
FIGS. 8 and 9 illustrate an example of a schedule of the wireless power transmission system of FIG. 7, in accordance with an embodiment.
Figure 9:
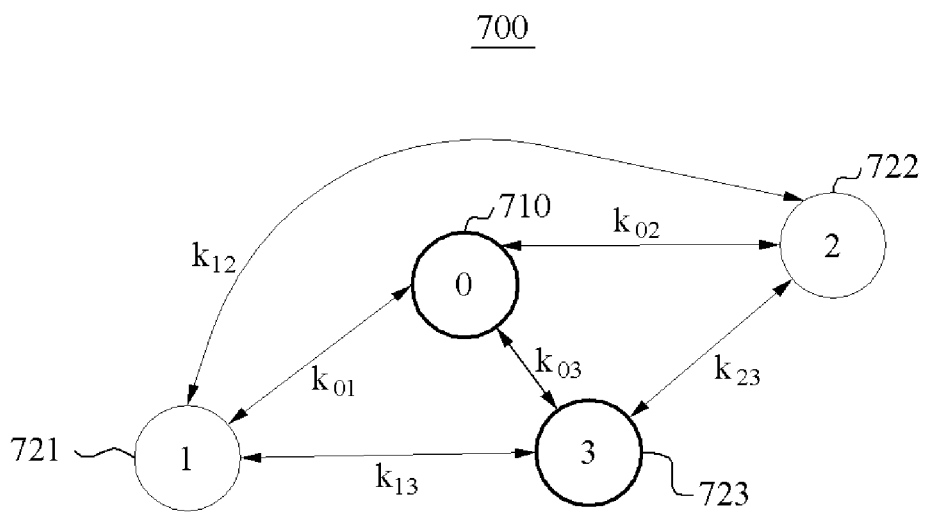

FIGS. 8 and 9 illustrate an example of a schedule of the wireless power transmission system 700, in accordance with an embodiment.

Referring to FIGS. 8 and 9, the wireless power transmission system 700 operates based on a transmission schedule. For example, the wireless power transmission system 700 is expressed by a coupling coefficient matrix K of Equation 13 shown below. In this example, a predetermined threshold $k_{th}$ in a near magnetic field channel with the coupling coefficient matrix K of Equation 13 has a value of "0.01." The predetermined threshold $k_{th}$ refers to a threshold coupling coefficient value used to determine whether a level of coupling between RX nodes is sufficiently low. For example, when a mutual coupling coefficient is not greater than a predetermined threshold, RX nodes may be determined not to be coupled.

$$K = \begin{bmatrix} 1 & 0.1 & 0.1 & 0.3 \\ 0.1 & 1 & 0.005 & 0.03 \\ 0.1 & 0.005 & 1 & 0.03 \\ 0.3 & 0.03 & 0.03 & 1 \end{bmatrix} \quad \text{[Equation 13]}$$

The coupling coefficient matrix K of Equation 13 is merely an example of a coupling coefficient matrix of the wireless power transmission system 700, and is arbitrarily set to provide an illustrative example. To determine a transmission schedule and a subset including RX nodes to maximize a transmission efficiency, the coupling coefficient matrix K may need to be estimated. An example of a process of estimating the coupling coefficient matrix K will be further described with reference to FIGS. 13 and 14.

Based on Equation 13, the mutual coupling coefficient $k_{12}$ between the first RX node 721 and the second RX node 722 has a value of "0.005", which is less than the predetermined threshold $k_{th}$ of "0.01". As a result, the first RX node 721 and the second RX node 722 simultaneously receive energy from the TX node 710. Additionally, the third RX node 723 may be excluded from a near magnetic field by interrupting mutual resonance with the TX node 710.

In addition, both the mutual coupling coefficient $k_{13}$ between the first RX node 721 and the third RX node 723, and the mutual coupling coefficient $k_{23}$ between the second RX node 722 and the third RX node 723 have values of "0.03", which is greater than the predetermined threshold $k_{th}$ of "0.01." Accordingly, the third RX node 723 receives energy from the TX node 710 during a time interval distinguished from the first RX node 721 and the second RX node 722. For example, when the first RX node 721 and the second RX node 722 simultaneously receive energy from the TX node 710 as shown in the enhanced portion of FIG. 8, the third RX node 723 receives energy from the TX node 710 as shown in the enhanced portion of FIG. 9.

In one illustrative example, in the wireless power transmission system 700 having the coupling coefficient matrix K of Equation 13, the first RX node 721 to the third RX node 723 are classified into two subsets. For example, the first RX node 721 and the second RX node 722 are classified as a first subset S1, and the third RX node 723 is classified as a second subset S2. The TX node 710 transmits energy to the first subset S1 as shown in the enhanced portion of FIG. 8, and transmits energy to the second subset S2 as shown in the enhanced portion of FIG. 9.

Figure 10:
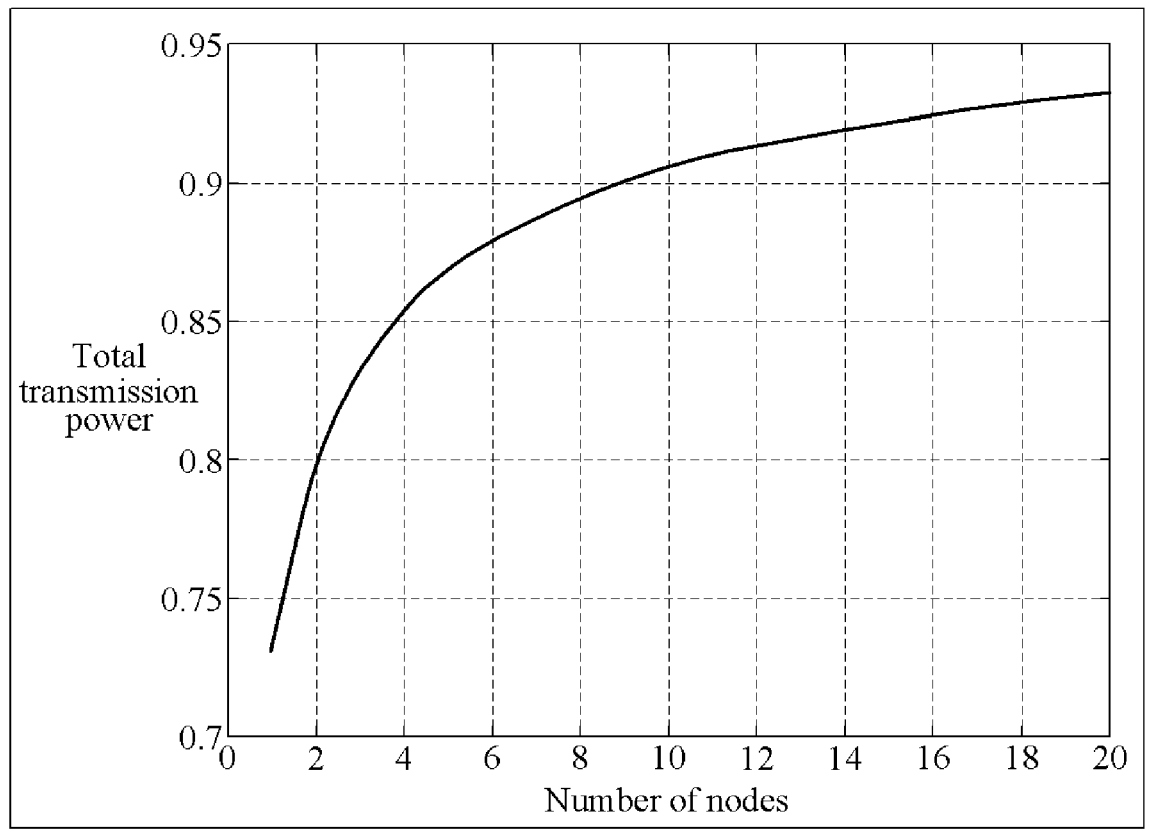
FIGS. 10 and 11 illustrate examples of an ideal transmission power based on a number of power reception apparatuses, in accordance with an embodiment.
Figure 11:
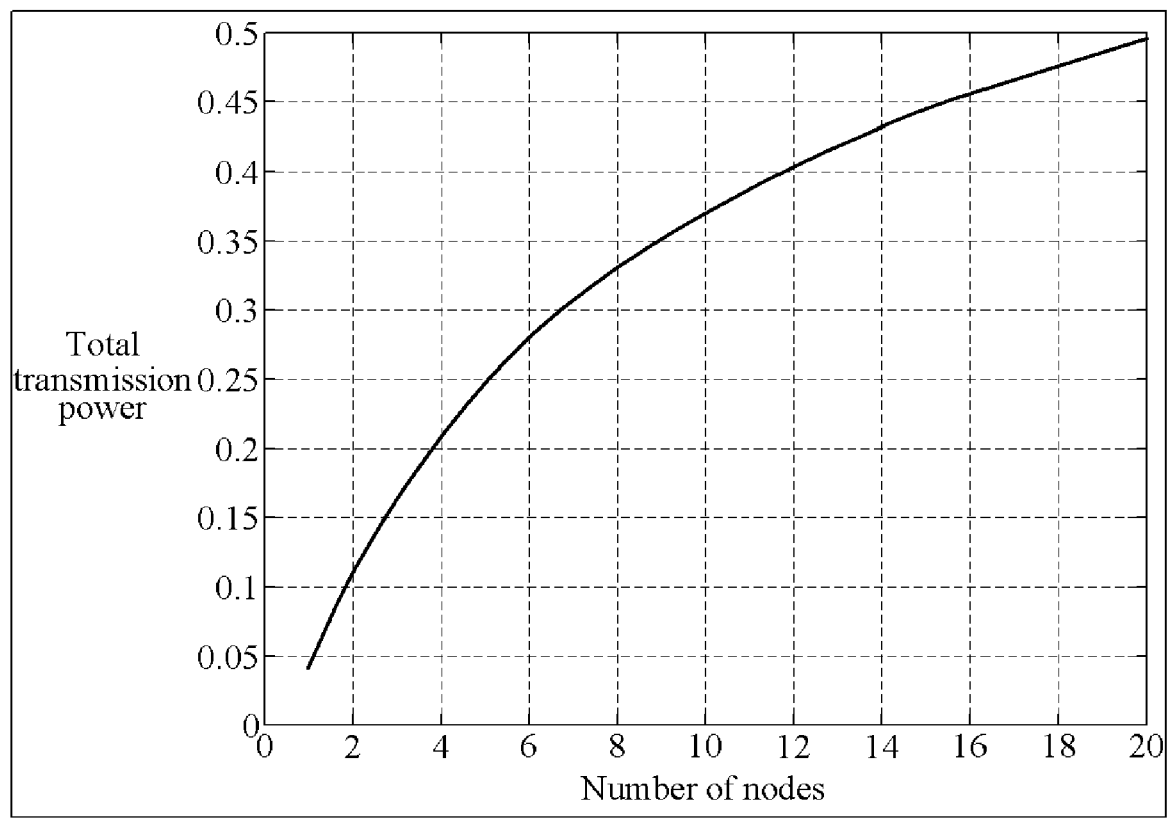

FIGS. 10 and 11 illustrate examples of an ideal transmission power based on a number of power reception apparatuses, in accordance with an embodiment.

Each of graphs illustrated in FIGS. 10 and 11 shows a total transmission power based on a number of RX nodes, when a distance between a TX node and each of the RX nodes is equal to each other, and when the RX nodes are not coupled to each other. When the number of RX nodes increases, the total transmission power increases.

In the example of FIG. 10, a mutual coupling coefficient between a TX node and each of RX nodes has a value of "0.1," and a quality factor Q has a value of "100." In the example of FIG. 11, a mutual coupling coefficient between a TX node and each of RX nodes has a value of "0.01," and a quality factor Q has a value of "100."

Compared with the graph of FIG. 11, the graph of FIG. 11 shows a great increase in the transmission efficiency based on an increase in the number of RX nodes. Accordingly, when a level of coupling between a TX node and an RX node decreases, a transmission efficiency increases effect based on an increase in the number of RX nodes.

Figure 12:
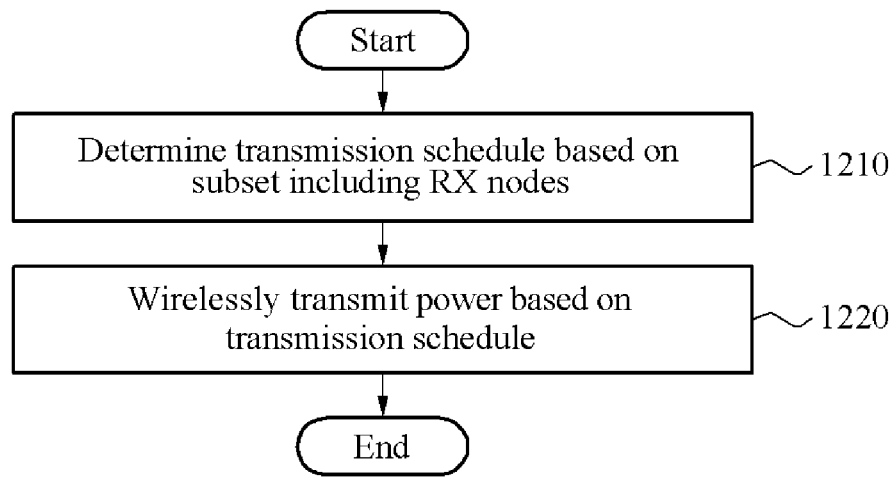
FIG. 12 illustrates an example of a wireless power transmission method, in accordance with an embodiment.

FIG. 12 illustrates an example of a wireless power transmission method, in accordance with an embodiment.

Referring to FIG. 12, in operation 1210, the method, through a processor of a power transmission apparatus, determines a transmission schedule based on a subset including a plurality of RX nodes. Examples of operation 1210 will be further described with reference to FIGS. 13 and 14.

In operation 1220, based on the transmission schedule, the method, using a TX resonator of the power transmission apparatus, wirelessly transmits power. For example, the TX resonator wirelessly transmits a power to at least one RX node corresponding to a subset during a predetermined time interval in a transmission period.

Figure 13:
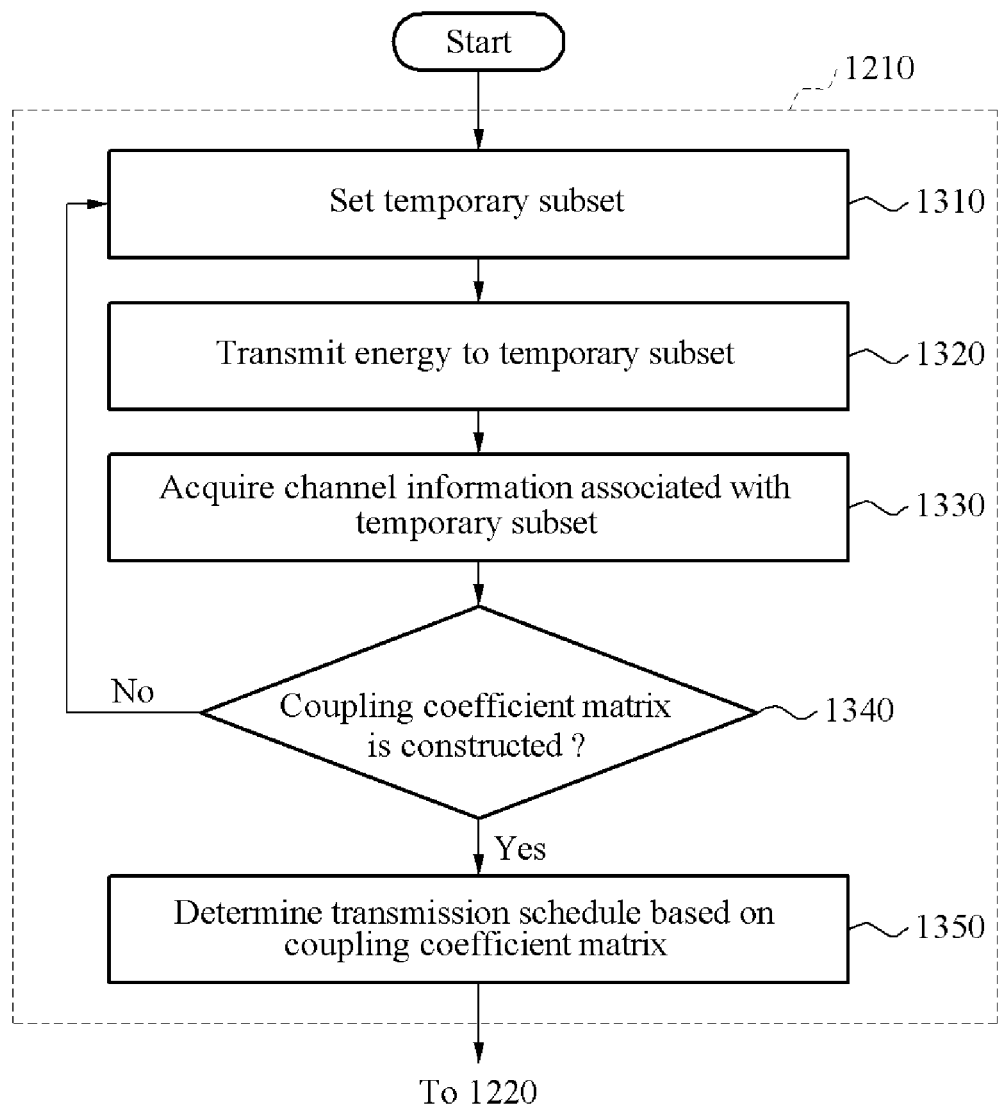
FIGS. 13 and 14 illustrate examples of a power transmission schedule method, in accordance with an embodiment.
Figure 14:
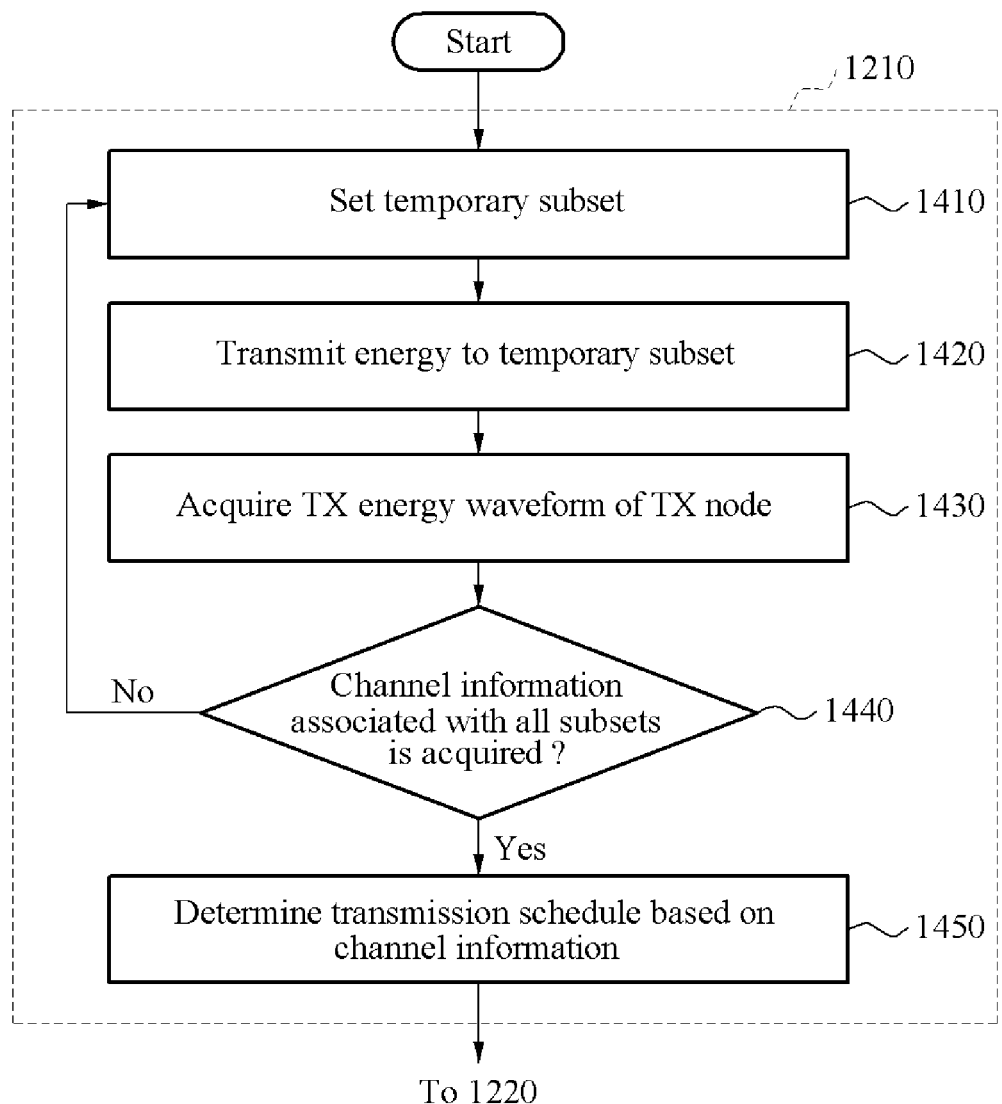

FIGS. 13 and 14 illustrate examples of a power transmission schedule method, in accordance with an embodiment.

FIG. 13 illustrates an example of operation 1210 of FIG. 12 to determine a transmission schedule based on channel information estimated by an RX node.

Referring to FIG. 13, in operation 1310, the method, using the processor of the power transmission apparatus, sets a temporary subset for a plurality of RX nodes. The method transmits temporary announcement information to each of the RX nodes designated as the temporary subset, through a communicator of the power transmission apparatus. The temporary announcement information includes, for example, information of the RX nodes designated as the temporary subset.

For example, the method uses the processor of the power transmission apparatus to set a temporary subset for RX nodes in different combinations for each sequence. When the temporary announcement information is received to an RX node, the RX node receives temporary energy in a corresponding sequence. The temporary energy refers to energy transmitted to estimate coupling information between RX nodes included in a temporary subset. For example, the method repeats a sequence until, using the processor of the power transmission apparatus, in operation 1340, the method determines that a coupling coefficient matrix is constructed.

In operation 1320, the method, using the processor of the power transmission apparatus, transmits energy to the temporary subset via the TX resonator. For example, the TX resonator transmits energy to at least one RX node designated as a temporary subset.

When a power reception apparatus and another RX node included in the temporary subset simultaneously receive energy (for example, temporary energy), the method uses a processor of the power reception apparatus to analyze an RX energy waveform corresponding to energy induced at an RX resonator of the power reception apparatus. For example, the method uses the processor of the power reception apparatus to analyze an RX energy waveform corresponding to the received energy, and to estimate channel information associated with a neighboring RX node designated as the temporary subset. When a mutual coupling coefficient corresponding to the analyzed RX energy waveform is greater than a predetermined threshold, the method uses the processor of the power reception apparatus to determine that coupling with the neighboring RX node is formed during reception of energy.

The RX energy waveform refers to a waveform of energy applied to the RX resonator when the power reception apparatus receives the temporary energy.

For example, the method uses the processor of the power reception apparatus to generate channel information including a result obtained by determining whether an RX node, to be coupled with the power reception apparatus at a mutual coupling coefficient greater than the predetermined threshold, is located adjacent to the power reception apparatus. The method uses a communicator of the power reception apparatus to transmit the channel information associated with RX nodes to a TX node, that is, the power transmission apparatus.

In operation 1330, through the communicator, the method uses the processor of the power transmission apparatus to acquire channel information associated with the temporary subset. For example, the method uses the processor to collect channel information estimated by an RX node from the RX node based on energy transmitted to the temporary subset. The channel information associated with the temporary subset includes, for example, a mutual coupling coefficient between RX nodes included in the temporary subset, or information on whether neighboring RX nodes coupled at a mutual coupling coefficient greater than a predetermined mutual coupling coefficient exist.

In operation 1340, the method uses the processor of the power transmission apparatus to determine whether the coupling coefficient matrix is constructed. When the coupling coefficient matrix is not constructed, at operation 1310, the method, through the processor of the power transmission apparatus, sets another temporary subset, and repeatedly performs operations 1310 through 1330. For example, the method uses the processor of the power transmission apparatus to generate a coupling coefficient matrix from the collected channel information. The coupling coefficient matrix refers to a matrix including, as an element, a mutual coupling coefficient between RX nodes, and may be represented by Equation 7.

In operation 1350, the method uses the processor of the power transmission apparatus to determine a transmission schedule based on the coupling coefficient matrix. The method uses the processor of the power transmission apparatus to classify a plurality of RX nodes as at least one subset, based on the coupling coefficient matrix. For example, the method uses the processor of the power transmission apparatus to classify RX nodes with a mutual coupling coefficient equal to or less than a predetermined threshold as a single subset, based on the coupling coefficient matrix.

Through the TX resonator, the method wirelessly transmits energy to the RX nodes classified as the at least one subset, based on the determined transmission schedule.

FIG. 14 illustrates another example of operation 1210 of FIG. 12 to determine a transmission schedule based on channel information estimated by a TX node, in accordance with an embodiment.

Referring to FIG. 14, in operation 1410, the method uses the processor of the power transmission apparatus to set a temporary subset including a plurality of RX nodes. The temporary subset is set for RX nodes in different combinations for each sequence.

In operation 1420, through the TX resonator of the power transmission apparatus, the method wirelessly transmits energy to the temporary subset.

In operation 1430, the method uses the processor of the power transmission apparatus to acquire a TX energy waveform of the TX node. The method uses the processor of the power transmission apparatus to acquire channel information associated with the temporary subset, based on the TX energy waveform. The channel information includes, for example, a transmission efficiency estimated for the temporary subset. For example, the TX energy waveform refers to a waveform of energy applied to the TX resonator during transmission of temporary energy.

In operation 1440, the method uses the processor of the power transmission apparatus to determine whether channel information associated with all subsets is acquired. The method uses the processor of the power transmission apparatus to identify a temporary subset with a maximum transmission efficiency among transmission efficiencies estimated for each temporary subset. For example, when five nodes are included in a wireless power transmission system, and when a maximum number of RX nodes that is included in a subset and that simultaneously receive energy is set to "3," through the TX node, the method determines a set of subsets with a maximum transmission efficiency by repeating a sequence 25 times obtained by $_5C_1 + _5C_2 + _5C_3$.

For example, in a current sequence, until the channel information is determined to be acquired in operation 1440, the method uses the processor of the power transmission apparatus to repeatedly perform operations 1410 to 1430 on a temporary subset including RX nodes in a different combination from a combination of RX nodes of a temporary subset in a previous sequence.

In operation 1450, the method uses the processor of the power transmission apparatus to determine a transmission schedule, based on the channel information. For example, the method of the processor of the power transmission apparatus determines a transmission schedule, based on a determined subset set with the maximum transmission efficiency, from channel information including transmission efficiencies estimated for each subset.

Figure 15:
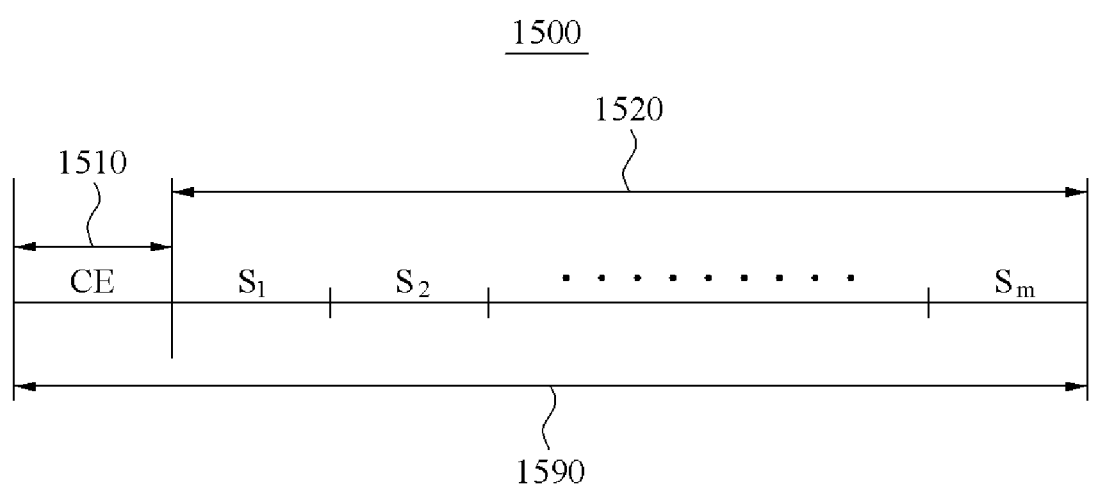
FIG. 15 illustrates an example of a transmission schedule, in accordance with an embodiment.

FIG. 15 illustrates an example of a transmission schedule 1500, in accordance with an embodiment.

Referring to FIG. 15, the transmission schedule 1500 includes at least one transmission period, for example, a transmission period 1590. The transmission period 1590 refers to a period required to transmit a predetermined amount of energy to all RX nodes. For example, the transmission schedule 1500 includes information associated with a time interval assigned to each subset, to transmit a predetermined amount of energy to all RX nodes within the transmission period 1590.

The transmission period 1590 includes a channel estimation (CE) time 1510, and an energy transmission time 1520. The CE time 1510 refers to a time required to collect channel information and a time to determine the transmission schedule 1500 as described above with reference to FIGS. 13 and 14.

The energy transmission time 1520 refers to a set of time intervals assigned to each subset. As shown in FIG. 15, the energy transmission time 1520 includes a time interval assigned to a first subset $S_1$, a time interval assigned to a second subset $S_2$, and a time interval assigned to an m-th subset $S_m$ in association with "n" RX nodes. A processor of a power transmission apparatus determines a time interval assigned to each of at least one subset within the transmission period 1590, based on a number of the at least one subset.

Additionally, an order in which energy is transmitted to each subset within the energy transmission time 1520 is determined based on a selection of a user, a priority, a number of RX nodes in a subset, and all criteria to optimize a transmission efficiency.

The CE time 1510 is included in the transmission period 1590 as shown in FIG. 15, however, other configurations are possible. For example, the transmission schedule 1500 is determined so that an initial transmission period includes the CE time 1510 and the energy transmission time 1520, and that a next transmission period includes the energy transmission time 1520 determined in the initial transmission period.

Figure 16:
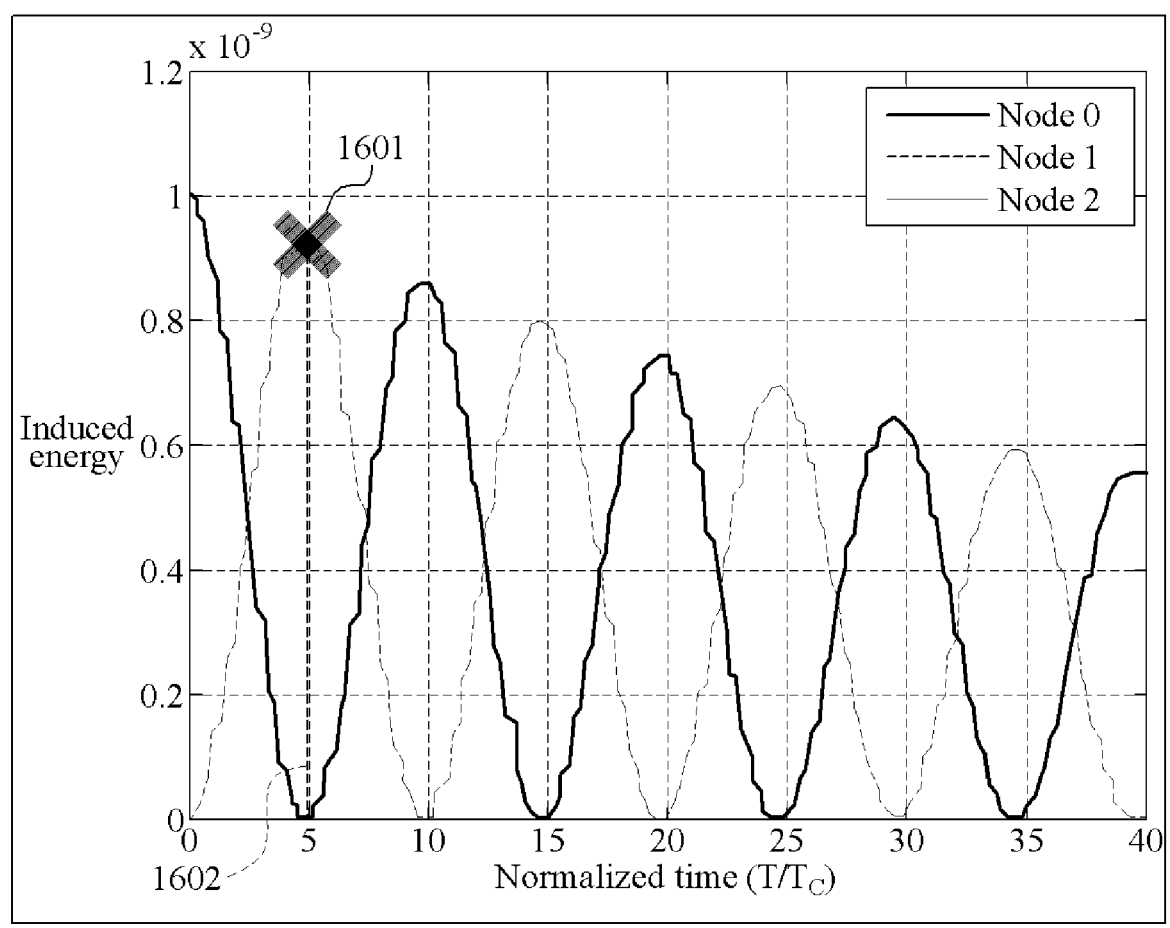
FIGS. 16 through 18 illustrate examples of power induced at a transmission (TX) node and a reception (RX) node that correspond to each coupling information, in accordance with an embodiment.
Figure 17:
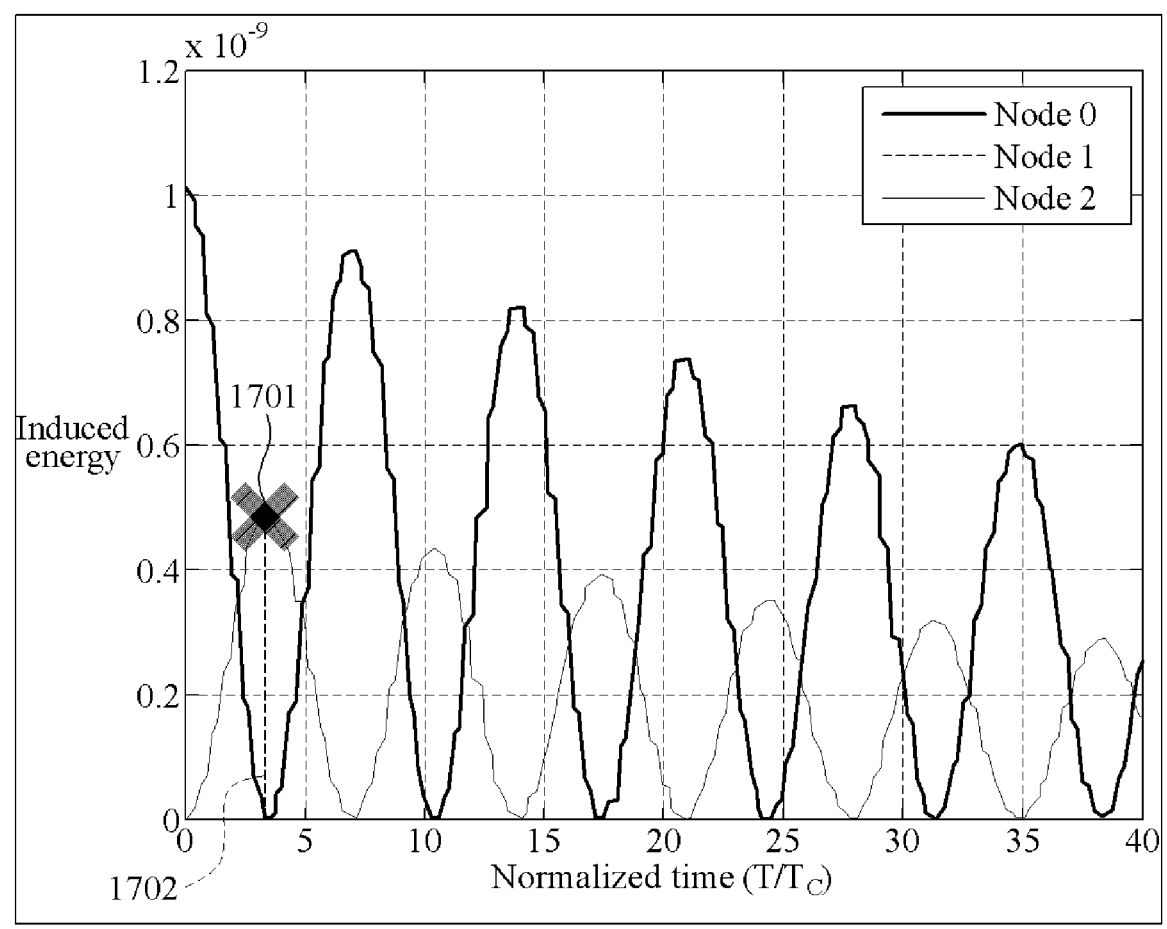
Figure 18:
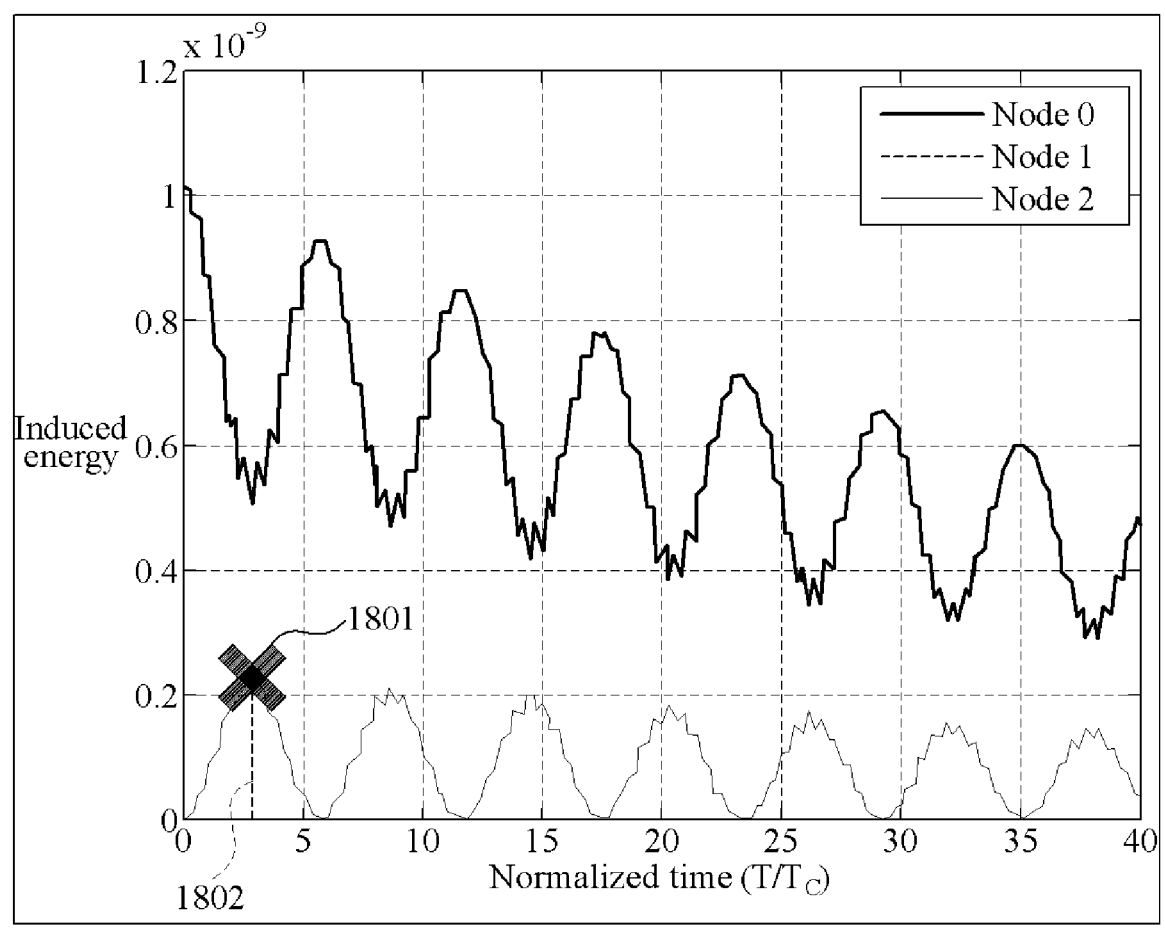

FIGS. 16 through 18 illustrate examples of power induced at a TX node and an RX node that correspond to each coupling information, in accordance with an embodiment.

In FIGS. 16 through 18, in a wireless power transmission system including a single TX node (for example, a node 0) and two RX nodes (for example, nodes 1 and 2), energy is induced at each of the nodes 0 to 2 for each mutual coupling coefficient. Each of the RX nodes observes a maximum amount of energy induced at an RX resonator, and a point in time corresponding to the maximum amount of energy.

In the example of FIG. 16, channel information indicates that a coupling coefficient $k_{01}$ between the nodes 0 and 1, a coupling coefficient $k_{02}$ between the nodes 0 and 2, and a coupling coefficient $k_{12}$ between the nodes 1 and 2 are set to "0.1," "0," and "0," respectively, and energy is transmitted to a subset including a single RX node.

In the example of FIG. 17, channel information indicates that a coupling coefficient $k_{01}$ between the nodes 0 and 1, a coupling coefficient $k_{02}$ between the nodes 0 and 2, and a coupling coefficient $k_{12}$ between the nodes 1 and 2 are set to "0.1," "0.1," and "0," respectively. In this example, the nodes 1 and 2 are not coupled with each other.

In the example of FIG. 18, channel information indicates that a coupling coefficient $k_{01}$ between the nodes 0 and 1, a coupling coefficient $k_{02}$ between the nodes 0 and 2, and a coupling coefficient $k_{12}$ between the nodes 1 and 2 are set to "0.1," "0.1," and "3," respectively. In this example, energy is transmitted to a subset including the nodes 1 and 2, and the nodes 1 and 2 are meaningfully coupled with each other.

In the channel information of FIG. 17, a maximum amount 1701 of energy applied to an individual RX node decreases in comparison to a maximum amount 1601 of energy of FIG. 16. Additionally, a point in time 1702 at which the maximum amount 1701 is observed may not be significantly delayed in comparison to a point in time 1602 at which the maximum amount 1601 is observed.

However, when a mutual coupling coefficient between RX nodes is greater than a predetermined threshold, as shown in the channel information of FIG. 18, a point in time 1802 at which a maximum amount 1801 of energy is observed may be significantly delayed.

As described above, according to various examples, an individual RX node determines whether coupling with another RX node in a temporary subset is formed, based on an RX energy waveform corresponding to received energy. The RX node provides channel information as feedback to a TX node through a communicator. The channel information includes, for example, information regarding a maximum amount of received energy, or whether coupling with another RX node is formed.

Additionally, the TX node determines whether coupling between RX nodes is formed, based on a TX energy waveform. For example, when a mutual coupling coefficient between RX nodes is greater than a predetermined threshold, a minimum amount of energy of the TX energy waveform increases, as shown in a TX energy waveform of the node 0 of FIG. 18.

As described above with reference to FIGS. 13 and 14, a TX node constructs or configures a coupling coefficient matrix from a result obtained by analyzing a TX energy waveform of each temporary subset and a result obtained by analyzing an RX energy waveform. A processor of the TX node combines subsets in which coupling is not formed, based on the coupling coefficient matrix, and determines a transmission schedule with a maximum transmission efficiency. A TX resonator of the TX node sequentially transmits energy to each of the subsets based on the transmission schedule.

The units and a communicator described herein may be implemented using hardware components. For example, the hardware components may include processors, controllers, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIGS. 12-14 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 12-14.

Program instructions to perform a method described in FIGS. 12-14, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power transmission apparatus, comprising:
a transmission (TX) resonator configured to transmit initial energy to a reception (RX) node;
a communicator configured to receive channel information from the RX node based on the transmitted initial energy; and
a processor configured to:
determine, from the received channel information, a mutual coupling coefficient of the RX node;
classify the RX node into a subset based on the determined mutual coupling coefficient, wherein the subset comprises one or more RX nodes; and
determine a transmission schedule based on the subset,
wherein the TX resonator wirelessly transmits energy to the RX node of the subset based on the transmission schedule,
wherein the communicator is further configured to transmit announcement information to the RX node, the announcement information comprising an identification of the one or more RX nodes,
wherein:
the announcement information further comprises an assignment of the one or more RX nodes to a temporary subset;
the TX resonator is further configured to wirelessly transmit the initial energy to an additional RX node based on the temporary subset; and
wherein the channel information is estimated between the one or more RX nodes based on an analyzed RX energy waveform corresponding to the initial energy.

2. The power transmission apparatus of claim 1, wherein the TX resonator is further configured to wirelessly transmit energy to each of a plurality of subsets in an order during a transmission period based on the transmission schedule.

3. The power transmission apparatus of claim 1, wherein the processor is further configured to assign a time interval to the subset, based on the transmission schedule.

4. The power transmission apparatus of claim 3, wherein the TX resonator is further configured to wirelessly transmit the energy to the RX node during the predetermined time interval.

5. The power transmission apparatus of claim 1, wherein the communicator is further configured to: receive additional channel information of a plurality of additional RX nodes, the additional channel information comprising respective additional mutual coupling coefficients of the additional RX nodes; and
the processor is further configured to: classify an additional RX node from among the plurality of additional RX nodes having a mutual coupling coefficient equal to or less than a predetermined threshold into the subset.

6. The power transmission apparatus of claim 1, wherein the channel information further comprises information of a coupling between the RX node and a second RX node.

7. The power transmission apparatus of claim 1, wherein the processor is further configured to create a temporary subset comprising a plurality of RX nodes including an additional RX node; and the communicator is further configured to receive, from the additional RX node, additional channel information estimated based on energy transmitted from the TX resonator to the temporary subset.

8. The power transmission apparatus of claim 7, wherein the processor is further configured to generate a coupling coefficient matrix from the additional channel information, and to classify the additional RX node into the subset based on the coupling coefficient matrix.

9. The power transmission apparatus of claim 1, wherein:
the processor is further configured to
estimate a transmission efficiency for the temporary subset, based on a TX energy waveform corresponding to the initial energy, and
determine the transmission schedule based on the transmission efficiency.

10. The power transmission apparatus of claim 1, wherein the processor is further configured to determine a time interval assigned to the subset during a transmission period.

11. A power reception apparatus comprising:
a processor configured to: estimate channel information based on a coupling between the power reception apparatus and an additional reception (RX) node;
a communicator configured to
transmit the channel information to a transmission (TX) node, and
receive, from the TX node, a transmission schedule based on the transmitted channel information,
wherein the processor is further configured to determine a subset of the power reception apparatus based on the received transmission schedule, wherein the subset comprises one or more RX nodes; and
an RX resonator configured to wirelessly receive energy corresponding to the subset from the TX node,
wherein the communicator is further configured to receive announcement information from the TX node, the announcement information comprising an identification of the additional RX node,
wherein:
the announcement information further comprises an assignment of the power reception apparatus and the additional RX node to a temporary subset;
the RX resonator is further configured to receive initial energy from the TX node based on the temporary subset; and the processor is further configured to estimate the channel information based on the initial energy.

12. The power reception apparatus of claim 11, wherein the RX resonator is further configured to wirelessly receive the energy from the TX node during a time interval corresponding to the subset.

13. The power reception apparatus of claim 11, wherein the processor is further configured to assign a predetermined time interval in which the power reception apparatus is to receive the energy from the TX node based on the transmission schedule.

14. The power reception apparatus of claim 11, wherein the processor is further configured to analyze an RX energy waveform corresponding to the initial energy, and to estimate the channel information between the power reception apparatus and the additional RX node based on the RX energy waveform.

15. The power reception apparatus of claim 11, wherein:
the communicator is further configured to transmit, to the TX node, the channel information comprising a result indicating whether the coupling between the power reception apparatus and the additional RX node exists; and
the processor is further configured to generate the channel information based on the result.

16. The power reception apparatus of claim 11, wherein, in response to a mutual coupling coefficient corresponding to an RX energy waveform being greater than a threshold, the processor is further configured to determine that the power reception apparatus is coupled with the additional RX node.

17. The power reception apparatus of claim 11, wherein the processor is further configured to:
transmit the initial energy to the additional RX node;
determine a level of the coupling between the power reception apparatus and the additional RX node based on the transmitted initial energy; and
estimate the channel information based on the determined level of the coupling.

18. The power transmission apparatus of claim 1, wherein:
the subset further comprises at least one additional RX node; and
the TX resonator is further configured to transmit the energy to the RX node and each additional RX node in the subset simultaneously.

* * * * *